US007215499B1

(12) United States Patent
Li et al.

(10) Patent No.: US 7,215,499 B1
(45) Date of Patent: May 8, 2007

(54) MULTI-STAGE ACTUATOR DISK DRIVE AND METHODS FOR CONTROLLING A TRANSDUCER WITH SETTLE-SWITCHING STATE DEPENDENT FEED-FORWARD CONTROL

(75) Inventors: Yunfeng Li, San Jose, CA (US); Yu Sun, Fremont, CA (US); Lin Guo, Saratoga, CA (US); Xiaoping Hu, Milpitas, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/180,283

(22) Filed: Jul. 13, 2005

Related U.S. Application Data

(60) Provisional application No. 60/649,903, filed on Feb. 3, 2005.

(51) Int. Cl.
G11B 21/02 (2006.01)
(52) U.S. Cl. ...................................................... 360/75
(58) Field of Classification Search ..................... None
See application file for complete search history.

(56) References Cited

U.S. PATENT DOCUMENTS

| | | | | |
|---|---|---|---|---|
| 5,867,342 A | * | 2/1999 | Hattori ..................... | 360/77.08 |
| 5,901,010 A | * | 5/1999 | Glover et al. ............ | 360/78.12 |
| 6,140,791 A | * | 10/2000 | Zhang ....................... | 318/632 |
| 6,590,734 B1 | * | 7/2003 | Ell ........................... | 360/78.05 |
| 6,747,836 B2 | * | 6/2004 | Stevens et al. .......... | 360/78.05 |
| 6,995,944 B1 | * | 2/2006 | Takaishi et al. ......... | 360/78.06 |
| 7,012,780 B1 | * | 3/2006 | Hu et al. ................. | 360/78.05 |

OTHER PUBLICATIONS

Guo et al.; *Track-following and Seek/settle Contol Schemes for High Density Disk Drives with Dual-stage Actuators*; IEEE/ASME International Conference on Advanced Intelligent Mechatronics Proceedings, 2001, pp. 1136-1141.
Yamaguchi et al; *Improvement of Settling Response of Disk Drive Head Positioning Servo using Mode Switching Control with Initial Value Compensation*; IEEE Transactions on Magnetics, vol. 32, No. 3, May 1996, pp. 1767-1772.

* cited by examiner

*Primary Examiner*—K. Wong
(74) *Attorney, Agent, or Firm*—Myers Bigel Sibley & Sajovec, PA

(57) ABSTRACT

A disk drive and method are provided for controlling seeking of a transducer that is adjacent to a rotatable data storage disk in a disk drive. The disk drive includes an actuator for positioning the transducer relative to the disk, the method comprising. The actuator is controlled to move the transducer toward a target track on the disk during an initial phase of a seek mode during which the transducer is primarily accelerated toward the target track. During a settle phase of the seek mode which follows the initial phase the actuator is controlled to settle the transducer onto the target track. An initial position, an initial velocity, and an initial acceleration of the transducer are determined at a phase switch time at about when control of the actuator switches from the initial phase to the settle phase of the seek mode. Feed-forward control information is generated based on the determined initial position, initial velocity, and initial acceleration of the transducer. The actuator is controlled responsive to the feed-forward control information to settle the transducer onto the target track during the settle phase of the seek mode.

18 Claims, 6 Drawing Sheets

MULTI-STAGE ACTUATOR DISK DRIVE AND METHODS FOR CONTROLLING A TRANSDUCER WITH SETTLE-SWITCHING STATE DEPENDENT FEED-FORWARD CONTROL

RELATED APPLICATION

This application claims the benefit of and priority to U.S. Provisional Patent Application Ser. No. 60/649,903, filed Feb. 3, 2005, the disclosure of which is hereby incorporated herein by reference as if set forth in its entirety.

FIELD OF THE INVENTION

The present invention generally relates to digital data storage devices and, more particularly, to a disk drive that seeks a transducer between tracks on a disk in the disk drive and related methods.

BACKGROUND OF THE INVENTION

Disk drives are digital data storage devices which can enable users of computer systems to store and retrieve large amounts of data in a fast and efficient manner. A typical disk drive includes a plurality of magnetic recording disks which are mounted to a rotatable hub of a spindle motor and rotated at a high speed. An array of read/write transducers is disposed adjacent surfaces of the disks to transfer data between the disks and a host computer. The transducers can be radially positioned over the disks by a rotary actuator and a closed loop, digital servo system, and can fly proximate the surfaces of the disks upon air bearings.

A plurality of nominally concentric tracks can be defined on each disk surface. A preamp and driver circuit generates write currents that are used by the transducer to selectively magnetize the tracks during a data write operation and amplifies read signals detected by the transducer from the selective magnetization of the tracks during a data read operation. A read/write channel and interface circuit are connected to the preamp and driver circuit to transfer the data between the disks and the host computer.

The servo system can operate in two primary modes: seeking and track following. During a seek, a selected transducer is moved from an initial track to a destination track on the corresponding disk surface. The servo system applies current to an actuator coil to accelerate the transducer toward the destination track. During the seek, the servo system may sequentially measure the actual velocity of the transducer and adjust the current in relation to velocity error (i.e., the difference between the actual velocity and a target velocity). As the transducer approaches the destination track, the servo system decelerates the transducer to bring it to rest over the destination track. Thereafter, the servo system enters the track following mode wherein the transducer is maintained over the center of the destination track until another seek is performed.

As will be appreciated, a disk drive is primarily utilized to transfer data between the tracks of the disks and the host computer. Such data transfer operations usually cannot occur during a seek, but rather require the drive to be in track following mode. Hence, to maximize disk drive data transfer rate capabilities, disk drives can attempt to obtain minimum average seek times. However, obtaining minimum seek times may be complicated by the fact that disk drive settle performance can be adversely affected by external vibration/shock, residual vibration of mechanical resonance modes, and variation over time of physical and/or electrical operational parameters of the disk drive, such as due to temperature variations, mechanical wear, and power supply voltage fluctuations.

SUMMARY OF THE INVENTION

Some embodiments of the present invention provide methods of controlling seeking of a transducer that is adjacent to a rotatable data storage disk in a disk drive. The disk drive includes an actuator for positioning the transducer relative to the disk, the method comprising. The actuator is controlled to move the transducer toward a target track on the disk during an initial phase of a seek mode during which the transducer is primarily accelerated toward the target track. During a settle phase of the seek mode which follows the initial phase the actuator is controlled to settle the transducer onto the target track. An initial position, an initial velocity, and an initial acceleration of the transducer are determined at a phase switch time at about when control of the actuator switches from the initial phase to the settle phase of the seek mode. Feed-forward control information is generated based on the determined initial position, initial velocity, and initial acceleration of the transducer. The actuator is controlled responsive to the feed-forward control information to settle the transducer onto the target track during the settle phase of the seek mode. Use of the feed-forward control information to settle the transducer onto the target track during the settle phase of the seek mode may cause the transducer to settle more quickly onto the target track.

In some other embodiments of the present invention, the disk drive includes a controller that is configured to control the actuator to move the transducer toward a target track on the disk during an initial phase of a seek mode during which the transducer is primarily accelerated toward the target track, and configured to control the actuator to settle the transducer onto the target track during a settle phase of the seek mode, which follows the initial phase. The controller determines an initial position, an initial velocity, and an initial acceleration of the transducer at a phase switch time at about when control of the coarse actuator switches from the initial phase to the settle phase of the seek mode. the controller generates feed-forward control information based on the determined initial position, initial velocity, and initial acceleration of the transducer, and controls the actuator responsive to the feed-forward control information to settle the transducer onto the target track during the settle phase.

In some further embodiments of the present invention, the actuator includes a microactuator that is configured to position the transducer relative to the disk, and a coarse actuator that is configured to position the microactuator. The controller includes a microactuator compensator, a coarse actuator compensator, and a trajectory generator. The microactuator compensator is configured to generate a microactuator feedback control signal responsive to a position error signal from servo information read from the disk by the transducer. The coarse actuator compensator is configured to generate a coarse actuator feedback control signal responsive to the position error signal. The trajectory generator is configured to generate a microactuator feed forward control signal and a coarse actuator feed forward control signal responsive to the determined initial position, initial velocity, and an initial acceleration of the transducer at the phase switch time. The microactuator is controlled responsive to the microactuator feedback control signal and the microactuator feed forward control signal, and the coarse actuator is controlled responsive to the coarse actuator feedback control signal and the coarse actuator feed forward control signal.

DETAILED DESCRIPTION OF THE INVENTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the term "and/or" includes any and all combinations of one or more of the associated listed items. It will be understood that, although the terms first, second, etc. may be used herein to describe various steps, elements and/or regions, these steps, elements and/or regions should not be limited by these terms. These terms are only used to distinguish one step/element/region from another step/element/region. Thus, a first step/element/region discussed below could be termed a second step/element/region without departing from the teachings of the present invention.

The present invention may be embodied in hardware (analog and/or discrete) and/or in software (including firmware, resident software, micro-code, etc.). Consequently, as used herein, the term "signal" may take the form of a continuous waveform and/or discrete value(s), such as digital value(s) in a memory or register.

The present invention is described below with reference to block diagrams of disk drives and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows. Like numbers refer to like elements throughout the description of the figures.

Figure 1:
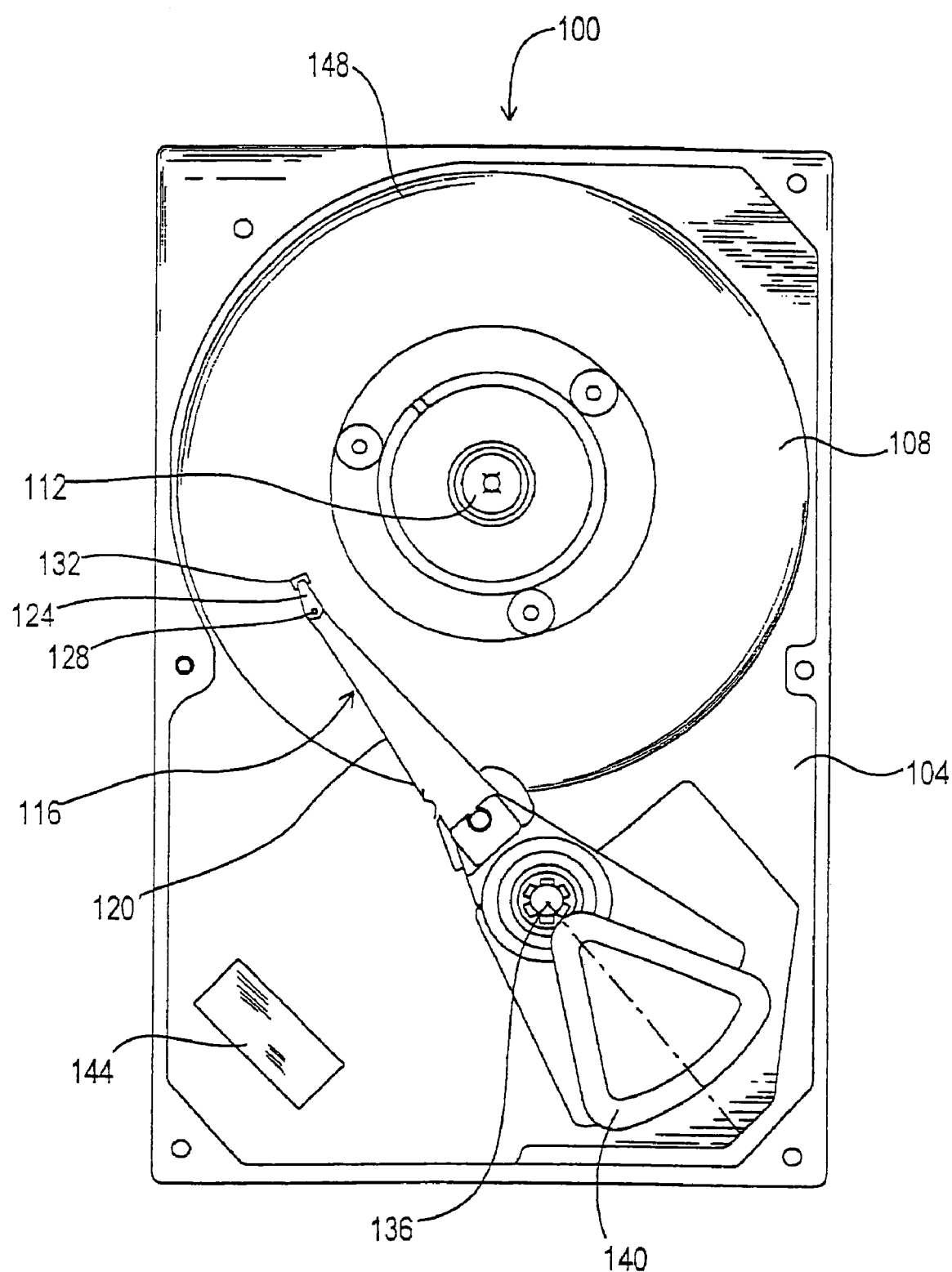
FIG. 1 is a block diagram of a disk drive having dual actuators and a controller that is configured to seek a transducer according to some embodiments of the present invention.

FIG. 1 illustrates a computer disk drive 100 with a dual stage actuator. The disk drive 100 includes a base 104 and one or more data storage disks 108 (only one of which is shown in FIG. 1). The disk 108 may be a magnetic disk, an optical disk, or any other type of data storage disk, and which may have data storage tracks defined on one or both of its storage surfaces. The disk 108 is interconnected to the base 104 by a spindle motor (not shown) mounted within or beneath the hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first stage 120 and the second stage 124 of the actuator arm assembly 116 is a microactuator 128. A transducer 132 is mounted on a distal portion of the actuator arm assembly 116. In particular, the transducer 132 can be coupled to an end of the second member 124 of the actuator arm assembly 116 so that it can be positioned adjacent to a storage surface of the disk 108. Although only one actuator arm assembly 116 is shown in FIG. 1, it is to be understood that a plurality of the actuator arm assemblies 116 may be interconnected and configured to position a transducer adjacent to each respective data storage surface of a stack of the disks 108.

The first member 120 of the actuator arm assembly 116 can be interconnected to the base 104 by a bearing 136. A coarse actuator 140 can pivot the actuator arm assembly 116 about the bearing 136 to position the microactuator 128 and, thereby, position the transducer 132 with respect to the disk 108. In particular, the coarse actuator 140 positions the transducer 132 to allow it to access different data tracks or cylinders 148 on the disk 108. The coarse actuator 140 is configured to position the microactuator 128 and, thereby, the transducer 132 over a first range of movement that may correspond to the distance between an inner and outer diameter of the storage surface of the disk 108. The coarse actuator 140 may be, for example, a motor such as a voice coil motor (VCM).

The articulation of the second member 124 with respect to the first member 120 of the actuator arm assembly 116 may be achieved by, for example, providing a journal bearing as part of the microactuator 128, by providing a flexible interconnection between the second member 124 and the first member 120, or by otherwise joining the second member 124 to the first member 120 in such a way that the second member 124 is allowed to move with respect to the first member 120.

The microactuator 128 is configured to position the transducer 132 relative to the disk 108 over a second range of movement that is less than the first range of movement provided by the coarse actuator 140. The microactuator 128 may affect finer positioning and/or higher frequency movements of the transducers 132 within its range of movement (e.g., over relatively short distances), such as that which may be encountered during short seeks (e.g., a few tracks) or during track following, compared to the coarse actuator 140. The microactuator 128 may also be utilized during the settle phase of long seeks when the distance between the transducer 132 and the target track is within the motion range of the microactuator to reduce settle time. The microactuator 128 may be any mechanism capable of moving the transducer 132 relative to the disk 108, such as by adjusting the relative position of the second member 124 with respect to the first member 120. For example, the microactuator 128 may be a piezoelectric actuator, an electromagnetic actuator, or an electrostatic actuator. Accordingly, the microactuator 128 may move the transducer 132 faster across the disk 108, within its range of movement, than may be possible with the coarse actuator 140.

A controller 144 is configured to control movement of the transducer 132 relative to the disk 108 via the coarse actuator 140 and the microactuator 128. The controller 144 moves the transducer 132 in two primary modes: a seek mode and a track following mode. During the seek mode, the controller 144 can be configured to move the transducer 132 from an initial track to a target track for which the host device has requested access using the coarse actuator 140; the microactuator 128, and/or a combination thereof.

The controller 144 may simultaneously control both the coarse actuator 140 and microactuator 128 when seeking the transducer 132. For example, the controller 144 may control the microactuator 128 to rapidly move the transducer 144 toward the target track while controlling the coarse actuator 140 to move the microactuator 128 and, thereby, the transducer 144 toward the target track. When the seek distance is within the range of movement of the microactuator 128, the transducer 128 may be primarily moved to the target track by the microactuator 128. As will be appreciated by one having skill in the art, the coarse actuator 140 and the microactuator 128 may be simultaneously controlled by the controller 144 by multitasking between operations that separately control the coarse actuator 140 and the microactuator 128, and/or the controller 144 may include two or more control units that control the coarse actuator 140 and the microactuator 128 in parallel. Following the seek mode when the transducer 132 has become substantially aligned with the target track, the controller 144 switches to the track following mode in which the transducer 132 is maintained over the target track while data is read from and/or written to the target track on the disk 108.

Figure 2:
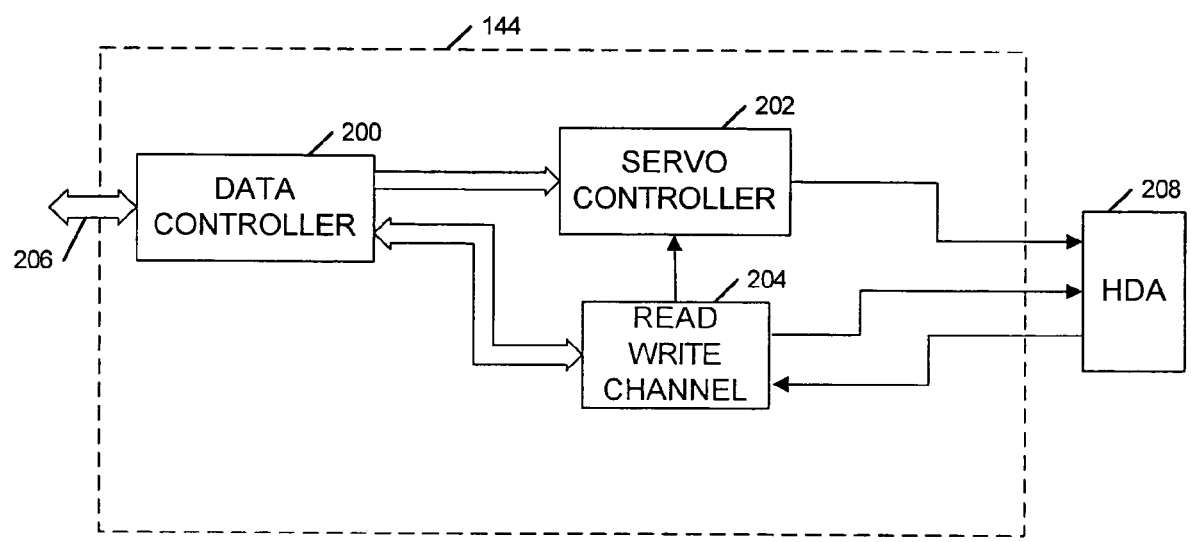
FIG. 2 is a block diagram of the controller of FIG. 1 in accordance with some embodiments of the present invention.

Referring to FIG. 2, the controller 144 can include a data controller 200, a servo controller 202, and a read/write channel 204. The exemplary embodiment of the controller 144 has been illustrated with components that include two separate controllers 200,202 and read/write channel 204 for purposes of illustration and discussion only. It is to be understood that the functionality that is described herein for these components may be consolidated in fewer components or distributed among more components.

The controller 144 is configured to respond to read and write instructions via a communication link 206 from a host device by reading and writing data on a head disk assembly (HDA) 208. The HDA 208 can include the actuator arm assembly 116, the disk stack 108, the microactuator 128, the coarse actuator 140, and the spindle motor. The read/write channel 204 can operate in a conventional manner to convert data between the digital form used by the data controller 200 and the analog form conducted through the transducer 132 in the HDA 208. The read/write channel 204 provides servo positional information read from the HDA 208 to the servo controller 202. The servo positional information can be used to detect the radial and circumferential location of the transducer 132 in relation to tracks and block addresses on the disk 108. The servo controller 202 can use the servo positional information to seek the transducer 132 to a target (e.g., host addressed) track and block on the disk 108, and to maintain the transducer 132 aligned with the target track while data is written/read on the disk 108.

The seek mode can include an initial phase and a settle phase. In the initial phase of the seek mode, the servo controller 202 primarily accelerates the transducer 132 from an initial position toward the target track. When the transducer 132 reaches a threshold distance from the target track and/or reaches a threshold velocity, the servo controller 202 switches to the settle phase of the seek mode. In the settle phase, the servo controller 202 controls the transducer 132 along a trajectory that brings the transducer 132 into alignment with the target track (such as along a centerline of the target track) with, preferably, minimum position overshoot or undershoot relative to the target track. Position undershoot/overshoot may result in a longer seek duration.

Figure 3:
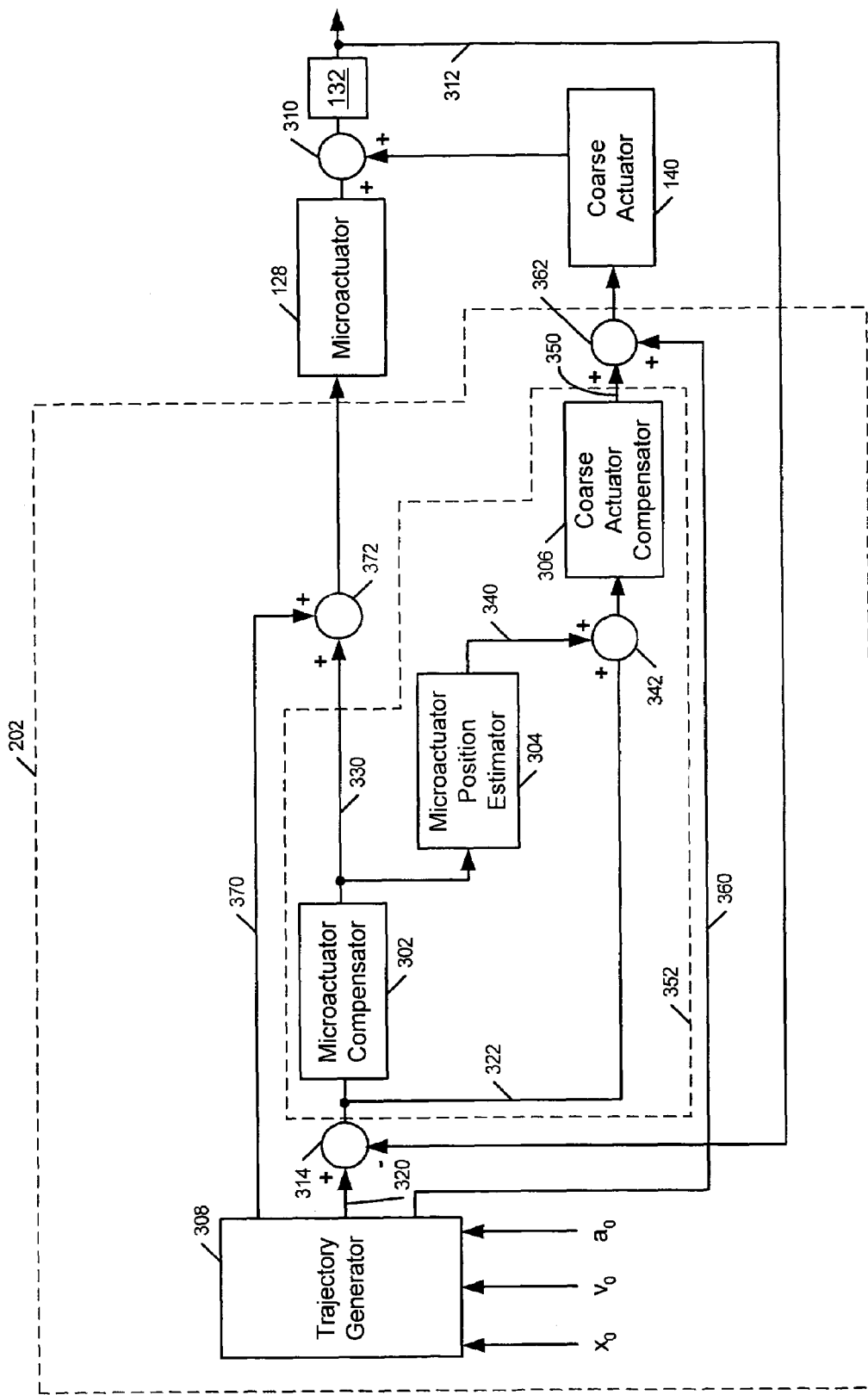
FIG. 3 is a block diagram of the servo controller of FIG. 2 in accordance with some embodiments of the present invention.

In accordance with some embodiments of the present invention, and as will be described in more detail further below, an initial position, velocity, and acceleration of the transducer 132 are determined at about a time when the servo controller 202 switches from the initial phase to the settle phase (i.e., a phase switch time) for controlling the coarse actuator 140 and/or the microactuator 128 during the seek mode. The initial position, velocity, and acceleration are then used to generate feed-forward control information which is used by the servo controller 202 to control the coarse actuator 140 and/or the microactuator 128 during the settle phase of the seek mode. By using the initial position, velocity, and acceleration, the servo controller 202 may be able to generate feed-forward control information that will allow the transducer 132 to more accurately settle onto the target track with about zero velocity and about zero acceleration during a last sample of the servo information associated with the target track, and thus eliminate undershoot/overshoot and reduce seek time FIG. 3 is a block diagram of the servo controller 202 that is configured to control the microactuator 128 and the coarse actuator 140 in accordance with some embodiments of the present invention. The servo controller 202 includes a microactuator compensator 302, a microactuator position estimator 304, a coarse actuator compensator 306, and a trajectory generator 308. The microactuator compensator 302, microactuator position estimator 304, and coarse actuator compensator 306 are also collectively referred to herein as a dual-stage controller 352. The servo controller 202 may be embodied as hardware and/or software.

The position of the transducer 132 relative to a track depends on a summation, performed at summing node 310, of the positioning contributions from the microactuator 128 and the coarse actuator 140. The servo controller 202 senses the position of the transducer 132 based on servo information that is read from the disk 108 to generate a sensed position signal 312. The sensed position signal 312 is fed-back to a summing node 314, where it is combined with a desired position reference signal 320 to generate a position error signal 322. During a track following mode, the position reference signal 320 may be a DC value, such as zero, to drive the transducer 132 toward a centerline of the track.

The microactuator compensator 302 is configured to control movement of the microactuator 128 based on the position error signal 322. For example, the microactuator compensator 302 generates a microactuator control signal 330 that compensates for high frequency components of the position error signal 322. The microactuator 128 can then effect high frequency movements of the transducer 132 within its range of movement based on the control signal 330. The microactuator position estimator 304 estimates the position of the microactuator 128 in its range of movement and generates an estimated microactuator position signal 340. The estimated microactuator position signal 340 is combined at a summing node 342 with the position error signal 322 and provided to the coarse actuator compensator 306.

The coarse actuator compensator 306 controls movement of the coarse actuator 140, via a coarse actuator control signal 350, based on the estimated microactuator position signal 340 and based on the position error signal 322. Accordingly, the response of the coarse actuator compensator 306 takes into account an estimate of the response of the microactuator 128 to the position error signal 322.

The trajectory generator 308 is configured to control moving of the transducer 132 by the coarse actuator 140 through a feed-forward signal 360 that it generates, and which is combined with the coarse actuator control signal 350 at summing node 362. The trajectory generator 308 can also control seeking of the transducer 132 by the microactuator 128 through a feed-forward signal 370 that it generates, and which is combined with the microactuator control signal 330 at summing node 372. Accordingly, during the settle phase of the seek mode, the trajectory generator 308 can move the transducer 132 to a target track by controlling the coarse actuator 140 and/or the microactuator 128. As will be described further below, the trajectory generator 308 generates the feed-forward signals 360, 370 to the coarse actuator 140 and the microactuator 128, respectively, based on an initial position ($x_0$), initial velocity ($v_0$), and initial acceleration ($a_0$) of the transducer 132 when control of the transducer switches from the initial phase to the settle phase of a seek mode.

Figure 4:
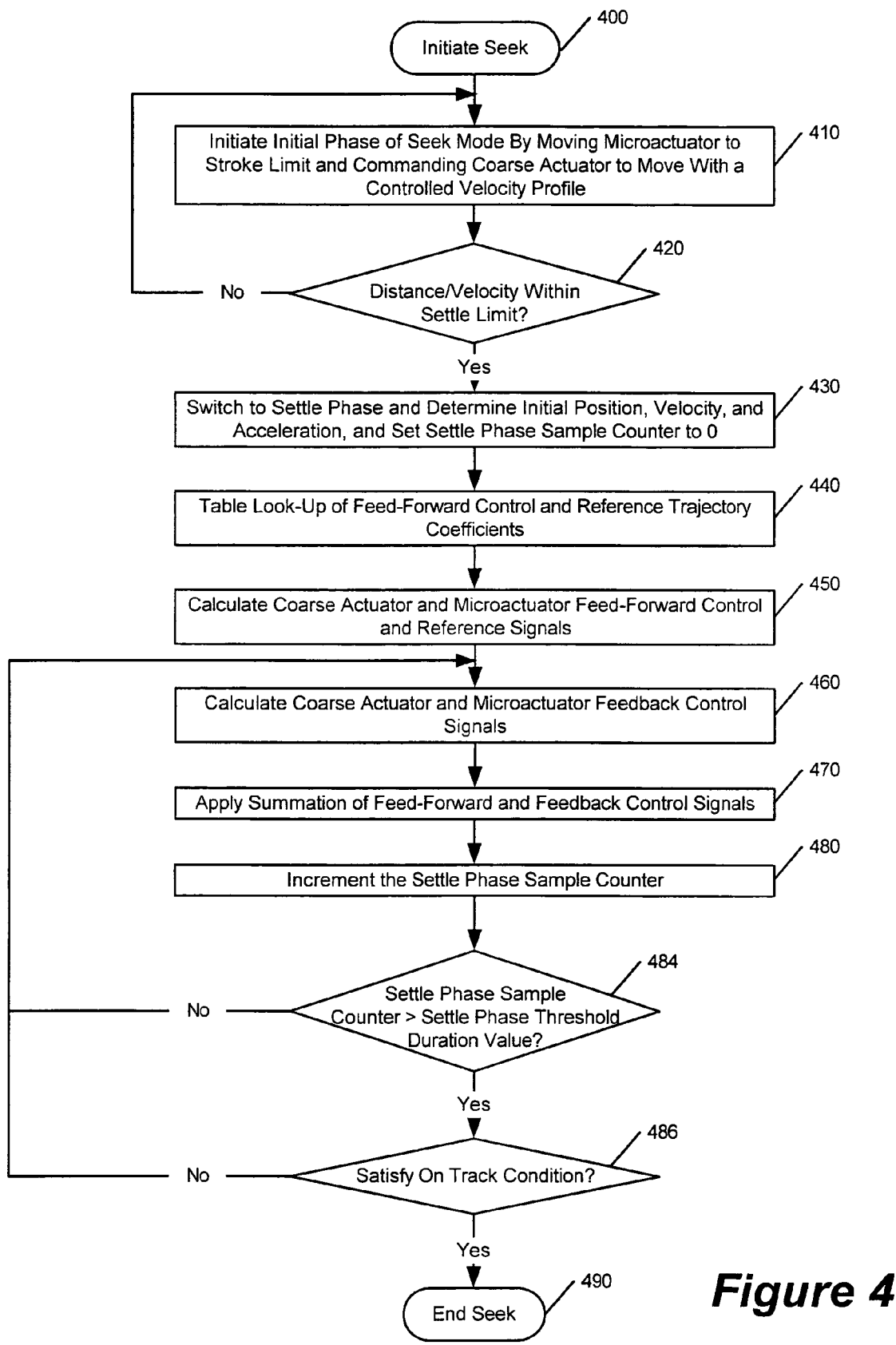
FIG. 4 is a flowchart illustrating operations for settling a transducer onto a target track using an initial position, velocity, and acceleration of the transducer at a phase switch time in accordance with some embodiments of the present invention.

With reference now to FIG. 4, a flowchart of operations is shown which may be carried out by the controller 144 and, more particularly, by the servo controller 202 during a seek mode to seek the transducer 132 to a target track in accordance with some embodiments of the present invention. Seeking of the transducer 132 to a target track is initiated at Block 400, such as in response to a data read/write access request from a host. At Block 410, an initial phase of the seek mode is initiated by moving the microactuator 128 to its stroke limit to move the transducer 132 toward the target track, and providing a current command to the coarse actuator 140 to move the actuator 132 with a controlled velocity profile. During the initial phase of the seek mode, the transducer 132 is primarily accelerated toward the target track in response to a defined velocity profile. A determination is made at Block 420 as to whether the transducer 132 has reached a defined initial-phase-to-settle-phase transition limit, which can be defined by a threshold transitional distance from the target track and/or whether the transducer 132 has reached a defined threshold transitional velocity.

When the initial-phase-to-settle-phase transition limit is determined to have been reached at Block 420, control of movement of the transducer 132 switches at Block 430 from the initial phase to the settle phase of the seek mode. During the settle phase, the transducer 132 is controlled to bring the transducer 312 rest on to the target track. Also at Block 430, the initial position, initial velocity, and initial acceleration of the transducer 132 are determined at a phase switch time at about when transducer control switches from the initial phase to the settle phase of the seek mode. The initial position may be determined based on the sensed position signal 312, the initial velocity may be estimated by a state estimator or observer, and the initial acceleration may be estimated based on a magnitude of the current command being provided to the coarse actuator 140 and a known acceleration response of the coarse actuator 140 to current commands. A settle phase sample counter is also set to zero.

At Block 440, the feed-forward control and reference trajectory coefficients are determined, such as by reference to a predefined table of values within the trajectory generator 308 and/or by solving a predefined polynomial equation. For example, the coefficients may be obtained from a table based on a number of sampled servo sectors (i.e., elapsed time) after switching to the settle phase of the seek mode. The polynomial equation may then be solved using as boundary conditions the determined initial position, velocity, and acceleration of the transducer 132 at the phase switch time and desired state of the transducer 132 upon reaching the target track. At Block 450, feed-forward control signals to the coarse actuator 140 and the microactuator 128, and the reference trajectory are generated based on the determined feed-forward control and reference trajectory coefficients, and based on the determined initial position, velocity, and acceleration of the transducer 132 at the phase switch time. For example, the feed-forward control and reference trajectory coefficients obtained from a predefined table may be first scaled based on the determined initial position, velocity, and acceleration of the transducer 132, and then summed together to generate the feedforward control signals and reference trajectory.

At Block 460, the feedback control signals, such as the microactuator control signal 330 and coarse actuator control signal 350 shown in FIG. 3, are generated. At Block 470, the feed-forward control signals are combined with the feedback control signals, such as at the summation nodes 372 and 362 shown in FIG. 3, to generate control signals that are used to control movement of the microactuator 128 and the coarse actuator 140. The settle phase sample counter is incremented at Block 480.

Accordingly, the initial position, velocity, and acceleration can be used as a snapshot of a state of the transducer 132 at the phase switch time, and which can be used to adjust how the coarse actuator 140 and/or microactuator 128 are controlled during the settle phase of the seek mode. The feed-forward signals that are used to control the coarse actuator 140 and microactuator 128 may thereby cause the transducer 132 to more accurately settle onto the target track with, for example, about zero velocity and about zero acceleration during a last sample (e.g., settle phase sample counter) of the seek operation to the target track.

A determination is made at Block 484 as to whether the settle phase sample counter exceeds a threshold settle phase threshold duration value and, if so, a further determination is made at Block 486 as to whether the transducer 132 is sufficiently aligned with the target track ("on track condition"). When the transducer 132 is sufficiently aligned with the target track, the seek mode is terminated at Block 490, and subsequent control of the transducer 132 is carried out within a track following mode.

Operations that may be carried out to determine the feed-forward control signals and reference trajectory based on the determined initial position, velocity, and acceleration will now be explained in accordance with some embodiments of the present invention. The coarse actuator 140 may be modeled by a double-integrator model, and an associated 5th order position polynomial trajectory of the transducer 132 can be defined as shown in Equation 1:

$$x(t)=c_5t^5+c_4t^4+c_3t^3+c_2t^2+ct+c_0, \quad \text{(Equation 1)}$$

where x(t) is the position of the transducer 132 over time, and the Cn terms are the polynomial coefficients.

The boundary conditions at the beginning of the settle phase are defined by Equation 2:

$$x(0)=x_0; \dot{x}(0)=v_0; \ddot{x}(0)=a_0, \quad \text{(Equation 2)}$$

where $x_0$, $v_0$, and $a_0$ are, respectively, the initial position, velocity and acceleration of the transducer 132 at the phase switch time about when control switches from the initial phase to the settle phase of the seek mode. Assuming the transducer 132 reaches the target track at a time $t_f$, the boundary condition at the end of the settle mode can be defined by Equation 3:

$$x(t_f)=0; \dot{x}(t_f)=0; \ddot{x}(t_f)=0. \quad \text{(Equations 3)}$$

The six unknown coefficients ($C_0$–$C_5$) in Equation 1 can be determined using the 6 boundary equations of Equations 2 and 3, as illustrated by the following Equations 4–9.

$$c_0=x_0; \quad \text{(Equation 4)}$$

$$c_1=v_0; \quad \text{(Equation 5)}$$

$$c_2=\tfrac{1}{2}a_0; \quad \text{(Equation 6)}$$

$$c_3 = -\frac{1}{2t_f^3}(20x_0 + 12v_0t_f + 3a_0t_f^2); \quad \text{(Equation 6)}$$

$$c_4 = -\frac{1}{2t_f^4}\left(15x_0 + 8v_0t_f + \frac{3}{2}a_0t_f^2\right); \text{ and} \quad \text{(Equation 8)}$$

$$c_5 = -\frac{1}{2t_f^5}\left(-6x_0 - 3v_0t_f - \frac{1}{2}a_0t_f^2\right). \quad \text{(Equation 9)}$$

From Equation 1 and Equations 4–9, the position trajectory x(t) of the transducer 132 can be defined as a linear Equation 10 based on the determined initial position ($x_0$), velocity ($v_0$), and acceleration ($a_0$) of the transducer 132 at the phase switch time, as shown below:

$$x(t)=c_{xx}x_0+x_{xv}v_0+c_{ha}a_0. \quad \text{(Equation 10)}$$

The coefficients $c_{xx}$, $c_{xv}$, and $c_{xa}$ can be determined from Equations 11–13, respectively, below:

$$c_{xx} = -6\left(\frac{t}{t_f}\right)^5 + 15\left(\frac{t}{t_f}\right)^4 - 10\left(\frac{t}{t_f}\right)^3 + 1; \quad \text{(Equation 11)}$$

$$c_{xv} = t_f\left[-3\left(\frac{t}{t_f}\right)^5 + 8\left(\frac{t}{t_f}\right)^4 - 6\left(\frac{t}{t_f}\right)^3 + \frac{t}{t_f}\right]; \text{ and} \quad \text{(Equation 12)}$$

-continued $$c_{xa} = t_f^2\left[-\frac{1}{2}\left(\frac{t}{t_f}\right)^5 + \frac{3}{2}\left(\frac{t}{t_f}\right)^4 - \frac{3}{2}\left(\frac{t}{t_f}\right)^3 + \frac{1}{2}\left(\frac{t}{t_f}\right)^2\right]. \quad \text{(Equation 13)}$$

The acceleration trajectory of the transducer 132 can be defined by Equation 14 below:

$$a(t)=\ddot{x}(t)=c_{ax}x_0+c_{av}v_0+c_{aa}a_0, \quad \text{(Equation 14)}$$

where $x_0$, $v_0$, and $a_0$ are the determined initial position, velocity, and acceleration of the transducer 132 at the phase switch time. The coefficients $c_{ax}$, $c_{av}$, and $c_{aa}$ can be determined from Equations 15–17, respectively, below:

$$c_{ax} = \frac{1}{t_f^2}\left[-120\left(\frac{t}{t_f}\right)^3 + 180\left(\frac{t}{t_f}\right)^2 - 60\frac{t}{t_f}\right]; \quad \text{(Equation 15)}$$

$$c_{av} = \frac{1}{t_f}\left[-60\left(\frac{t}{t_f}\right)^3 + 96\left(\frac{t}{t_f}\right)^2 - 36\frac{t}{t_f}\right]; \text{ and} \quad \text{(Equation 16)}$$

$$c_{aa} = -10\left(\frac{t}{t_f}\right)^3 + 18\left(\frac{t}{t_f}\right)^2 - 9\frac{t}{t_f}. \quad \text{(Equation 17)}$$

Accordingly, the position and acceleration trajectories of the transducer 132 can be determined using Equations 10 and 14 based on the determined initial position $x_0$, velocity $v_0$, and acceleration $a_0$ of the transducer 132 at about the phase switch time. An exemplary table of coefficients $c_{xx}$, $c_{xv}$, and $c_{xa}$ of the position trajectory defined by Equation 10 for an exemplary system model is shown in Table 1 below:

TABLE 1

| | $c_{xx}(kT_s)$ | $c_{xv}(kT_s)$ | $c_{xa}(kT_s)$ |
|---|---|---|---|
| k = 0 | 1.0000 | 0 | 0 |
| k = 1 | 0.9978 | 0.9785 | 0.3383 |
| k = 2 | 0.9839 | 1.8423 | 1.1002 |
| k = 3 | 0.9512 | 2.5143 | 1.9820 |
| k = 4 | 0.8965 | 2.9531 | 2.7714 |
| k = 5 | 0.8200 | 3.1480 | 3.3354 |
| k = 6 | 0.7248 | 3.1128 | 3.6086 |
| k = 7 | 0.6160 | 2.8810 | 3.5806 |
| k = 8 | 0.5000 | 2.5000 | 3.2846 |
| k = 9 | 0.3840 | 2.0255 | 2.7849 |
| k = 10 | 0.2752 | 1.5161 | 2.1652 |
| k = 11 | 0.1800 | 1.0281 | 1.5161 |
| k = 12 | 0.1035 | 0.6094 | 0.9238 |
| k = 13 | 0.0488 | 0.2946 | 0.4574 |
| k = 14 | 0.0161 | 0.0991 | 0.1572 |
| k = 15 | 0.0022 | 0.0140 | 0.0226 |
| k = 16 | 0 | 0 | 0 |

The term k is a number of samples from initiation of the settle phase, $c_{xx}$ is the coefficient defined by Equation 11, $c_{xv}$ is the coefficient defined by Equation 12, and $c_{xa}$ is the coefficient defined by Equation 13. As will be appreciated, the number of sampled servo sectors is indicative of an elapsed time from initiation of the settle phase.

An exemplary table of coefficients $c_{ax}$, $c_{av}$, and $c_{aa}$ of the position trajectory defined by Equation 14 for the exemplary system model is shown in Table 2 below:

TABLE 2

|  | $c_{ax}(kT_s)$ | $c_{av}(kT_s)$ | $c_{aa}(kT_s)$ |
|---|---|---|---|
| k = 1 | 0 | 0 | 1.0000 |
| k = 2 | −0.0146 | −0.1438 | 0.5054 |
| k = 3 | −0.0234 | −0.2373 | 0.1367 |
| k = 4 | −0.0272 | −0.2870 | −0.1206 |
| k = 5 | −0.0268 | −0.2997 | −0.2813 |
| k = 6 | −0.0230 | −0.2821 | −0.3599 |
| k = 7 | −0.0167 | −0.2408 | −0.3711 |
| k = 8 | −0.0088 | −0.1826 | −0.3296 |
| k = 9 | 0 | −0.1142 | −0.2500 |
| k = 10 | 0.0088 | −0.0421 | −0.1470 |
| k = 11 | 0.0167 | 0.0268 | −0.0352 |
| k = 12 | 0.0230 | 0.0858 | 0.0708 |
| k = 13 | 0.0268 | 0.1284 | 0.1563 |
| k = 14 | 0.0272 | 0.1478 | 0.2065 |
| k = 15 | 0.0234 | 0.1374 | 0.2070 |
| k = 16 | 0.0146 | 0.0903 | 0.1431 |
|  | 0 | 0 | 0 |

The term k is the number of samples from initiation of the settle phase, $c_{ax}$ is the coefficient defined by Equation 15, $c_{av}$ is the coefficient defined by Equation 16, and $c_{aa}$ is the coefficient defined by Equation 17.

An exemplary use of the table of coefficients $c_{xx}$, $c_{xv}$, and $c_{xa}$ of the position trajectory defined by Equation 10 and the table of coefficients $c_{ax}$, $c_{av}$, and $c_{aa}$ of the position trajectory defined by Equation 14 for the exemplary system will now be discussed below. The position trajectory of the transducer 132 over time can be defined by Equation 18 below:

$$x(t)=c_{xx}(t)x_0+c_{xv}(t)v_0+c_{xa}(t)a_0. \quad \text{(Equation 18)}$$

Similarly, the acceleration trajectory of the transducer 132 over time can be defined by Equation 19 below:

$$a(t)=c_{ax}(t)x_0+c_{av}(t)v_0+c_{aa}(t)a_0. \quad \text{(Equation 19)}$$

The coefficients $c_{xx}$, $c_{xv}$, $c_{xa}$, $c_{ax}$, $c_{av}$, $c_{aa}$ of Equations 18 and 19 may be determined from Tables 1 and 2 above, and the terms $x_0$, $v_0$, and $a_0$ can be defined by the determined initial position, velocity, and acceleration of the transducer at the phase switch time.

The feed-forward signal 360 (FIG. 3) to the coarse actuator 140 can be generated based on Equations 18 as shown below by Equation 20:

$$u^{\mathit{ff}}_v(k)=a(kT_s)/g_a, k=1\ldots N_s, \quad \text{(Equation 20)}$$

where "$u^{\mathit{ff}}_v(k)$" is the feed-forward signal 360, "a" is determined from Equation 19 using the coefficients from Table 2, $T_s$ is the sample time, k is a count of the number of samples following the initial switch to the settle phase of the seek mode, and $g_a$ is a defined acceleration gain of the coarse actuator 140 responsive to the output of the summation node 362. It is assumed that the settle phase of the seek mode takes Ns samples to complete.

As discussed above, at the beginning of the seek mode, feed-forward signal 370 can be used to move the microactuator 128 to its stroke limit and to maintain that position until initiation of the settle phase of the seek mode. Assuming the microactuator 128 can be modeled with a DC gain, the feed-forward signal 370 that is generated during the settle phase of the seek mode can be defined by Equation 21 below:

$$u^{\mathit{ff}}_M(k)=\text{sat}(-x((k+1)T_s)/g_m), k=1\ldots N_s, \quad \text{(Equation 21)}$$

where "$u^{\mathit{ff}}_M(k)$" is the feed-forward signal 370, the term "sat" denotes that the microactuator 128 is operating in a saturated mode (i.e., is constrained by a limit of its movement), "x" can be determined from Equation 18 based on the coefficients of Table 1, and $g_M$ is a defined gain of the microactuator 128 responsive to the output of the summation node 372. When the distance between the coarse actuator 140 position and a target track is less than the stroke limit of the microactuator 128, the feed-forward signal 370 can be used to start retracting the microactuator 128 so as to follow an opposite path of the coarse actuator 140.

The position reference signal 320 (FIG. 3) can equal a summation of the predicted position of the coarse actuator 140 and the microactuator 128 with the feed-forward signals 360, 370 respectively applied to them. The position reference signal 320 can be defined by the following Equation 22:

$$r(k)=x(k*Ts)+u^{\mathit{ff}}_M(k-1)g_M, k=1\ldots N_s, \quad \text{(Equation 22)}$$

where r(k) is the position reference signal 320 and the other terms are defined above. With reference to Equations 21 and 22, when the distance between the course actuator position and the target track is within the motion range of the microactuator, the transducer 132 has reached the target track, and the position reference signal 320 equals zero. Time delay factors can also be included in Equations 21 and 22.

With reference to Equations 18–22, the feed-forward signals 360, 370 and the position reference signal 320 can have a linear relationship to the initial position, velocity and acceleration of the transducer 132 at the phase switch time. Their calculations can be implemented as a predefined table, such as by Tables 1 and 2. At each sample during the settle phase of the seek mode, a set of coefficients can be retrieved by a look-up from tables (e.g., Tables 1 and 2 for one exemplary disk drive). The coefficients can then be scaled based on the initial position, velocity and acceleration of the transducer 132, and combined with the provided equations to generate the feed-forward signals 360, 370 and the position reference signal 320 for a present sample.

Figure 5:
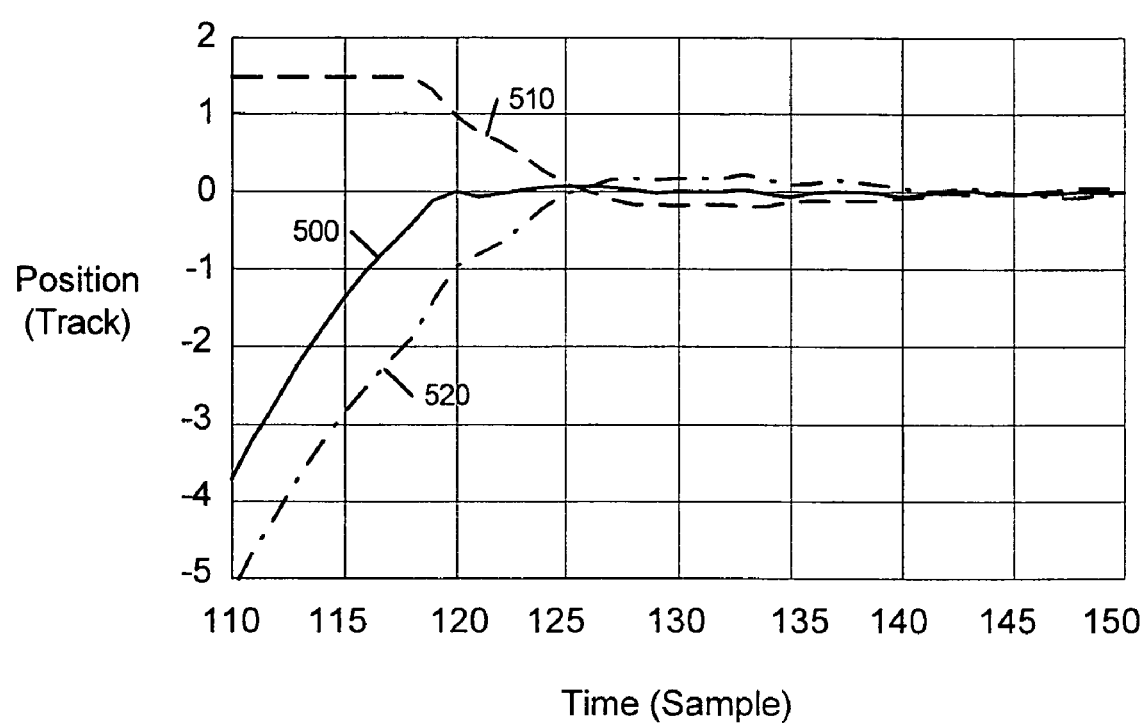
FIG. 5 is a graph illustrating results of simulations of the radial path during settle phase of a transducer, a microactuator, and a coarse actuator while seeking the transducer according to some embodiments of the present invention.
Figure 6:
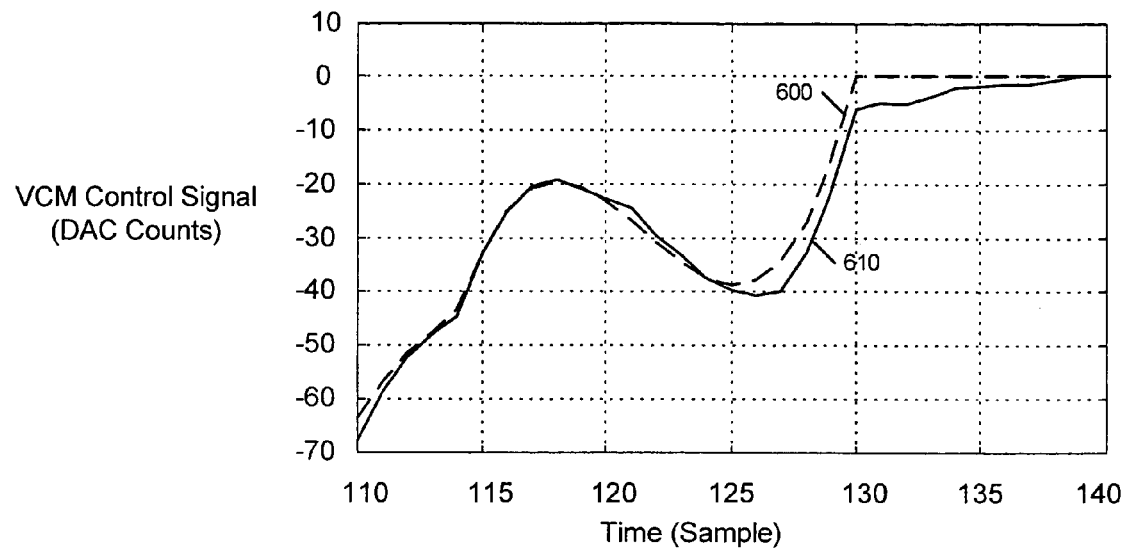
FIG. 6 is a graph illustrating results of simulations of an exemplary feed-forward signal that is generated for the coarse actuator of FIG. 5 and a combined signal from the feed-forward signal and a feedback signal that is provided to the coarse actuator.
Figure 7:
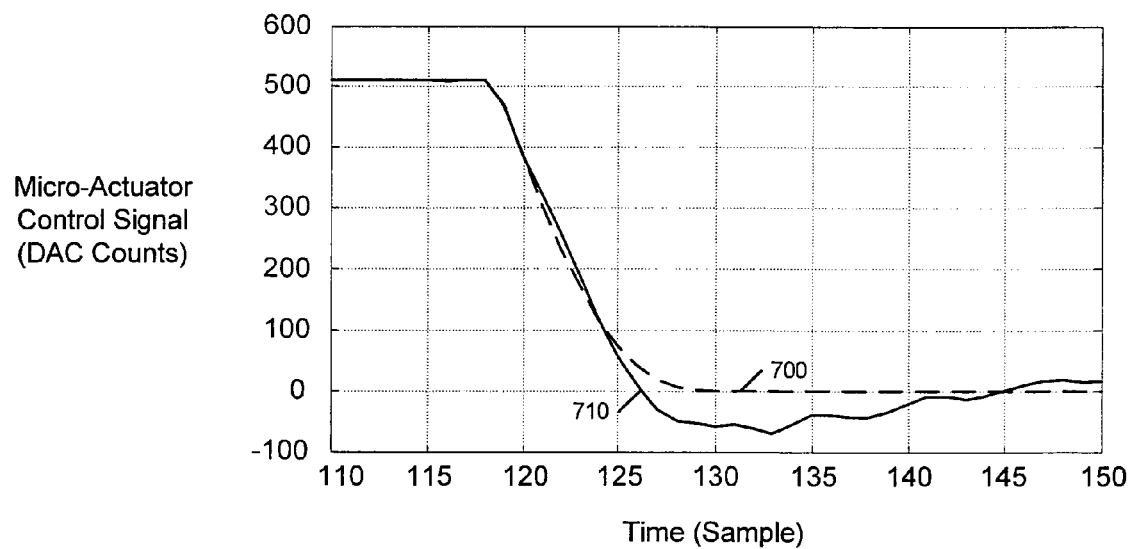
FIG. 7 is a graph illustrating results of simulations of an exemplary feed-forward signal that is generated for the microactuator of FIG. 5 and a combined signal from the feed-forward signal and a feedback signal that is provided to the microactuator.

FIGS. 5–7 are graphs that illustrate exemplary results of a simulation of the radial path of the transducer 132 using the coarse actuator 140 and microactuator 128 during a seek mode in accordance with some embodiments of the present invention. The simulated microactuator has a stroke limit of 1.5 tracks.

FIG. 5 illustrates the radial path 500 of the transducer 132, the path 510 of the microactuator 128, and the path 520 of the coarse actuator 140 relative to a counted number of samples after initiation of a seek mode. The coarse actuator 140 and microactuator 128 are controlled pursuant to an initial phase of the seek mode up to the 113th sample. Control then switches to a settle phase of the seek mode and completes the seek mode (i.e., transducer 132 is sufficiently aligned with the target track) at the 130th sample. The coarse actuator 140 is simulated with an initial position of 2.8 tracks, initial velocity of 0.36 tracks/sample, and initial acceleration (e.g., based on a previous coarse actuator input control signal) of −45 counts at initiation of the settle phase. The transducer 132 reaches the target track at the 119th sample, at which time the microactuator 128 starts to retract to a nominal position within its range of movement. While the microactuator 128 is retracted, the coarse actuator 140 continues to move so as to maintain the transducer 132 substantially aligned with the target track and so that data may be read/written on the disk 108 while the microactuator 128 is retracted.

FIG. 6 illustrates an exemplary feed-forward signal 360 (shown as line 600) that is generated for the coarse actuator 140 and a combined signal (shown as line 610) that is output from the summation node 362 to the coarse actuator 140. As shown, the feed-forward signal 360 and combined signal (shown as lines 600,610) exhibit a relatively smooth transition from the initial phase to the settle phase of the seek mode. The smooth transition may avoid the excitation of undesirable structural vibrational modes in the disk drive 100.

FIG. 7 illustrates an exemplary feed-forward signal 370 (shown as line 700) that is generated for the microactuator 128 and a combined signal (shown as line 710) that is output from the summation node 372 to the microactuator 128. As shown, the microactuator 128 retracted to a nominal location within its range of motion near the end of the settle phase of the seek mode.

The foregoing discussion of the invention has been presented for purposes of illustration and description. Further, the description is not intended to limit the invention to the form disclosed herein. Consequently, variations and modifications commensurate with the above teachings are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments.

What is claimed is:

1. A method of controlling seeking of a transducer that is adjacent to a rotatable data storage disk in a disk drive, the disk drive having an actuator for positioning the transducer relative to the disk, the method comprising:
   controlling the actuator to move the transducer toward a target track on the disk during an initial phase of a seek mode during which the transducer is primarily accelerated toward the target track;
   controlling the actuator to settle the transducer onto the target track during a settle phase of the seek mode which follows the initial phase;
   determining an initial position, an initial velocity, and an initial acceleration of the transducer at a phase switch time at about when control of the actuator switches from the initial phase to the settle phase of the seek mode; and
   generating feed-forward control information based on the determined initial position, initial velocity, and initial acceleration of the transducer, and wherein controlling the actuator to settle the transducer onto the target track during the settle phase of the seek mode is responsive to the feed-forward control information,
   wherein determining the initial acceleration of the transducer at the phase switch time comprises estimating the initial acceleration based on magnitude of a current command provided to the coarse actuator at the phase switch time.

2. The method of claim 1, wherein the actuator comprises a microactuator configured to position the transducer relative to the disk and a coarse actuator configured to position the microactuator, and wherein:
   controlling the actuator to move the transducer toward a target track on the disk during an initial phase of a seek mode comprises controlling the coarse actuator to move the transducer toward a target track on the disk during the initial phase of the seek mode; and
   controlling the actuator to settle the transducer onto the target track during the settle phase of the seek mode comprises controlling the coarse actuator and the microactuator to settle the transducer onto the target track during the settle phase of the seek mode.

3. The method of claim 1 further comprising:
   monitoring a radial distance between the transducer and the target track while controlling the coarse actuator during the initial phase of the seek mode; and
   switching from controlling the actuator during the initial phase of the seek mode to controlling the actuator during the settle phase of the seek mode in response to the radial distance becoming less than a threshold transition distance.

4. The method of claim 1, wherein determining the initial position of the transducer at the phase switch time comprises measuring a radial track position of the transducer based on servo information read from the disk at the phase switch time.

5. The method of claim 1, wherein generating feed-forward control information based on the determined initial position, initial velocity, and initial acceleration of the transducer comprises:
   solving a predefined polynomial equation based on the determined initial position, initial velocity, and initial acceleration of the transducer to generate the feed-forward control information.

6. A method of controlling seeking of a transducer that is adjacent to a rotatable data storage disk in a disk drive, the disk drive having an actuator for positioning the transducer relative to the disk, the method comprising:
   controlling the actuator to move the transducer toward a target track on the disk during an initial phase of a seek mode during which the transducer is primarily accelerated toward the target track;
   controlling the actuator to settle the transducer onto the target track during a settle phase of the seek mode which follows the initial phase;
   determining an initial position, an initial velocity, and an initial acceleration of the transducer at a phase switch time at about when control of the actuator switches from the initial phase to the settle phase of the seek mode; and
   generating feed-forward control information based on the determined initial position, initial velocity, and initial acceleration of the transducer, and wherein controlling the actuator to settle the transducer onto the target track during the settle phase of the seek mode is responsive to the feed-forward control information, wherein generating feed-forward control information based on the determined initial position, initial velocity, and initial acceleration of the transducer comprises
   solving a predefined polynomial equation based on the determined initial position, initial velocity, and initial acceleration of the transducer to generate the feed-forward control information by:
   obtaining coefficients from a table in the disk drive based on elapsed time after switching to the settle phase of the seek mode; and
   solving the predefined polynomial equation based on the coefficients obtained from the table and based on the determined initial position, initial velocity, and initial acceleration of the transducer to generate the feed-forward control information.

7. The method of claim 1, wherein generating feed-forward control information based on the determined initial position, initial velocity, and initial acceleration of the transducer comprises:

monitoring a radial distance between the transducer and the target track during the settle phase of the seek mode;

obtaining coefficients from a table in the disk drive based on elapsed time after switching to the settle phase of the seek mode;

scaling the coefficients based on the determined initial position, initial velocity, and initial acceleration of the transducer to generate scaled coefficients; and generating the feed-forward control information based on a sum of the scaled coefficients.

8. The method of claim 7, further comprising:

controlling the actuator to settle the transducer onto the target track during the settle phase of the seek mode responsive to the feedforward control information.

9. A disk drive comprising:

a data storage disk;

a transducer configured to read data from the disk and/or to write data to the disk;

an actuator that is configured to position the transducer relative to the disk;

a controller that is configured to control the actuator to move the transducer toward a target track on the disk during an initial phase of a seek mode during which the transducer is primarily accelerated toward the target track, configured to control the actuator to settle the transducer onto the target track during a settle phase of the seek mode which follows the initial phase, configured to determine an initial position, an initial velocity, and an initial acceleration of the transducer at a phase switch time at about when control of the coarse actuator switches from the initial phase to the settle phase of the seek mode, and configured to generate feed-forward control information based on the determined initial position, initial velocity, and initial acceleration of the transducer, and to control the actuator responsive to the feed-forward control information to settle the transducer onto the target track during the settle phase, wherein the controller is further configured to determine the initial acceleration of the transducer based on magnitude of a current command provided to the actuator at the phase switch time.

10. The disk drive of claim 9, wherein:

the actuator comprises a microactuator configured to position the transducer relative to the disk, and a coarse actuator configured to position the microactuator;

the controller is configured to control the coarse actuator to move the transducer toward a target track on the disk during the initial phase of the seek mode, and to control the coarse actuator and the microactuator to settle the transducer onto the target track during the settle phase of the seek mode.

11. The disk drive of claim 10, wherein the controller comprises:

a microactuator compensator that is configured to generate a microactuator feedback control signal responsive to a position error signal from servo information read from the disk by the transducer;

a coarse actuator compensator that is configured to generate a coarse actuator feedback control signal responsive to the position error signal; and a trajectory generator that is configured to generate a microactuator feed forward control signal and a coarse actuator feed forward control signal responsive to the determined initial position, initial velocity, and an initial acceleration of the transducer at the phase switch time, wherein the microactuator is controlled responsive to the microactuator feedback control signal and the microactuator feed forward control signal, and the coarse actuator is controlled responsive to the coarse actuator feedback control signal and the coarse actuator feed forward control signal.

12. The disk drive of claim 10, wherein the coarse actuator comprises a voice coil motor.

13. The disk drive of claim 10, wherein the controller is further configured to control the microactuator to settle the transducer onto the target track during the settle phase of the seek mode responsive to the feed-forward control information.

14. The disk drive of claim 9, wherein the controller is further configured to monitor a radial distance between the transducer and the target track while controlling the actuator during the initial phase of the seek mode, and to switch from controlling the actuator during the initial phase of the seek mode to controlling the actuator during the settle phase of the seek mode in response to the radial distance becoming less than a threshold transition distance.

15. The disk drive of claim 9, wherein the controller is further configured to determine the initial position of the transducer based on servo information read from the disk at the phase switch time.

16. The disk drive of claim 9, wherein the controller is further configured to solve a predefined polynomial equation based on the determined initial position, initial velocity, and initial acceleration of the transducer to generate the feed-forward control information.

17. A disk drive comprising:

a data storage disk;

a transducer configured to read data from the disk and/or to write data to the disk;

an actuator that is configured to position the transducer relative to the disk;

a controller that is configured to control the actuator to move the transducer toward a target track on the disk during an initial phase of a seek mode during which the transducer is primarily accelerated toward the target track, configured to control the actuator to settle the transducer onto the target track during a settle phase of the seek mode which follows the initial phase, configured to determine an initial position, an initial velocity, and an initial acceleration of the transducer at a phase switch time at about when control of the coarse actuator switches from the initial phase to the settle phase of the seek mode, and configured to generate feed-forward control information based on the determined initial position, initial velocity, and initial acceleration of the transducer, and to control the actuator responsive to the feed-forward control information to settle the transducer onto the target track during the settle phase, wherein the controller is further configured to solve a predefined polynomial equation based on the determined initial position, initial velocity, and initial acceleration of the transducer to generate the feed-forward control information, and wherein the controller is further configured to obtain coefficients from a table in the disk drive based on elapsed time after switching to the settle phase of the seek mode, and to solve the predefined polynomial equation based on the coefficients obtained from the table and based on the determined initial position, initial velocity, and initial acceleration of the transducer to generate the feed-forward control information.

18. The disk drive of claim 9, wherein the controller is further configured to monitor a radial distance between the transducer and the target track during the settle phase of the seek mode, to obtain coefficients from a table in the disk drive based on elapsed time after switching to the settle phase of the seek mode, to scale the coefficients based on the determined initial position, initial velocity, and initial acceleration of the transducer to generate scaled coefficients, and to generate the feed-forward control information based on a sum of the scaled coefficients.

* * * * *